W. P. HANSELL.
CAR-SPRING.

No. 190,582. Patented May 8, 1877.

Witnesses:
J. A. Rutherford
Lloyd Norris

Walter P. Hansell
by Johnson & Johnson
his Attys.

UNITED STATES PATENT OFFICE.

WALTER P. HANSELL, OF PITTSBURG, PENNSYLVANIA, ASSIGNOR OF ONE-THIRD OF HIS RIGHT TO BIDDLE R. HANSELL, OF SAME PLACE.

IMPROVEMENT IN CAR-SPRINGS.

Specification forming part of Letters Patent No. 190,582, dated May 8, 1877; application filed October 13, 1876.

*To all whom it may concern:*

Be it known that I, WALTER P. HANSELL, of Pittsburg, in the county of Allegheny and State of Pennsylvania, have invented a new and useful Improvement in Car-Springs, of which the following is a specification:

My object is to obtain a metallic spring that can be used upon the journal-box of a railway-car in place of the rubber spring, and that will act under light or heavy loads. It is composed of two helical or cone-shaped sections, arranged with their largest diameters upon a bearing or division plate, by which they and said plate are confined and braced in position. These sections, when joined, each form a double spring, in which the coils of greatest diameter yield under light loads, while the end coils of the smallest diameter are the strongest and yield under heavy loads. This form of spring, however, is not claimed, except in combination with a dividing bearing-plate and an intervening spring. The intermediate bearing-plate has a central opening, and an outer and an annular rim projecting from each face to form annular seats, and confine itself and the springs in place. To increase the strength, if necessary, of these separate springs, I arrange a smaller spring or springs within them, passing through the bearing-plate, and extending to the smallest ends of the springs. This central spring has no bearing on the helical springs, except at their smallest ends, and, therefore, avoids noise and wearing of the springs, while aiding to keep the outer springs in place. The inner ends of the separate springs are held by the bearing-plate, while the outer ends of the interior spring have their bearings within the outer small coils.

Figure 1:
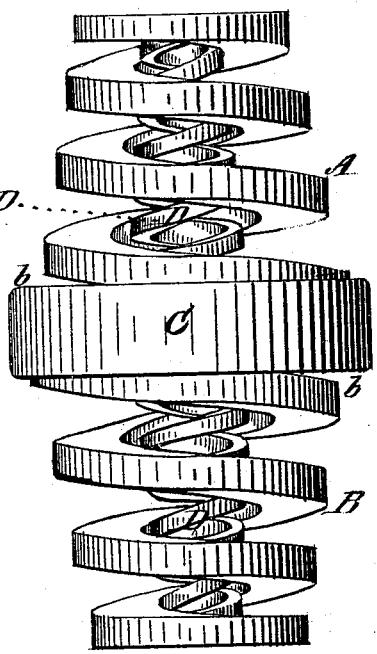
Figure 2:
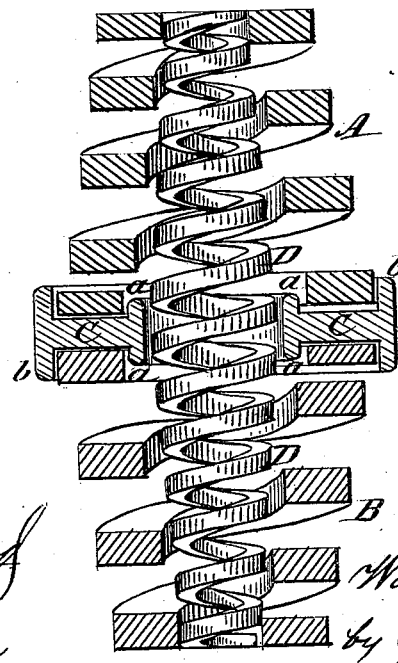

In the accompanying drawings, Figure 1 represents an elevation of a spring embracing my invention, and Fig. 2 a vertical section.

The separate springs A and B are of helical form, and arranged upon a bearing or division plate, C, with their coils of larger diameter bearing upon the opposite sides of such plate, which has a central opening and an inner and an outer rim, *a b*, projecting from opposite faces of said plate, which form upper and lower annular seats for the coils of greatest diameter, and hold the plate centrally with the spring. A smaller spring, D, is arranged within the helical springs, and extends from one small end thereof to the other through the opening in the bearing-plate.

This interior spring is coiled in an opposite direction to the helical springs, and has a bearing connection with them only at the extreme ends. It may also taper from the middle coils to each end, or be a common cylindrical spring, and may be of two separate springs, also bearing upon the intermediate plate. I prefer, however, to make it of a single bar, and its employment is to increase the strength of the spring.

The spring thus constructed has a barrel form of two separate sections, each section being, by its taper form, adapted for heavy and light loads, and for use generally, but is well suited for what is known as a "journal-box spring," being strong and durable, and can be inclosed, like the rubber spring, upon the usual holding-bosses. The central spring may be coiled in the same direction as the helical springs, if desired.

I claim—

The combination of two helical springs, A and B, their division bearing-plate C, provided with a central opening, and an interior spring or springs, D, substantially as described.

In testimony whereof I have affixed my signature in the presence of two witnesses.

WALTER P. HANSELL.

Witnesses:
JAMES B. COYLE,
GEO. W. MORRIS.